(12) United States Patent
Gall et al.

(10) Patent No.: US 11,054,011 B2
(45) Date of Patent: Jul. 6, 2021

(54) AUTOMOTIVE DIFFERENTIAL AND METHOD OF ASSEMBLING SAME

(71) Applicant: GKN Automotive Limited, Worcestershire (GB)

(72) Inventors: David E. Gall, Clarkston, MI (US); Kevin J. Kaplan, Macomb, MI (US)

(73) Assignee: GKN Automotive Limited, Worcestershire (GB)

(*) Notice: Subject to any disclaimer, the term of this patent is extended or adjusted under 35 U.S.C. 154(b) by 67 days.

(21) Appl. No.: 16/084,267

(22) PCT Filed: Mar. 15, 2017

(86) PCT No.: PCT/US2017/022439
§ 371 (c)(1),
(2) Date: Sep. 12, 2018

(87) PCT Pub. No.: WO2017/160931
PCT Pub. Date: Sep. 21, 2017

(65) Prior Publication Data
US 2019/0072170 A1    Mar. 7, 2019

Related U.S. Application Data

(60) Provisional application No. 62/308,696, filed on Mar. 15, 2016.

(51) Int. Cl.
*F16H 48/38*    (2012.01)
*F16H 57/022*   (2012.01)
*B60B 35/16*    (2006.01)

(52) U.S. Cl.
CPC ............. *F16H 48/38* (2013.01); *B60B 35/16* (2013.01); *F16H 2048/382* (2013.01);
(Continued)

(58) Field of Classification Search
CPC ............ F16H 48/38; F16H 2057/0227; F16H 2057/0228; F16H 2048/387;
(Continued)

(56) References Cited

U.S. PATENT DOCUMENTS 3,703,108 A   11/1972   McCaw
3,872,741 A    3/1975   Berchtold et al.
(Continued)

FOREIGN PATENT DOCUMENTS

CN    104747682 A    7/2015
JP    S4735557       11/1972
(Continued)

OTHER PUBLICATIONS

European Extended Search Report for Application No. 17767400.9 dated Oct. 8, 2019 (11 pages).
(Continued)

*Primary Examiner* — Ernesto A Suarez
*Assistant Examiner* — Lillian T Nguyen
(74) *Attorney, Agent, or Firm* — Jennifer M. Brumbaugh; Reising Ethington P.C.

(57) ABSTRACT

In at least one implementation, a method of assembling gears into a housing of an automotive differential includes, selecting a thickness dimension of first and second pinion gear washers, and first and second side gear washers, locating a pair of pinion gears, a pinion shaft and a pair of side gears at least partially within an interior of the housing with the pinion gear washers between the housing and separate ones of the pinion gears, and the side gear washers between the housing and separate ones of the side gears. The thickness of the side gear washers may be a function of target side gear apex positions and relative to a pinion gear apex axis. The thickness of the pinion gear washers may be
(Continued)

a function of target pinion gear apex positions residing along a pinion gear apex axis and relative to a side gear apex axis.

8 Claims, 2 Drawing Sheets

(52) U.S. Cl.
CPC ............... *F16H 2048/387* (2013.01); *F16H 2057/0227* (2013.01); *F16H 2057/0228* (2013.01); *Y02T 10/84* (2013.01)

(58) Field of Classification Search
CPC .. F16H 2048/382; F16H 57/022; F16H 48/08; Y02T 10/84; B60B 35/16
See application file for complete search history.

(56) References Cited

U.S. PATENT DOCUMENTS

| | | | |
|---|---|---|---|
| 4,513,635 A | 4/1985 | Takimura et al. | |
| 4,747,322 A * | 5/1988 | Orain | F16H 48/28 475/225 |
| 4,821,395 A | 4/1989 | Cook | |
| 4,914,807 A | 4/1990 | Cook | |
| 5,584,777 A * | 12/1996 | Sander | F16H 48/08 475/230 |
| 7,207,110 B2 | 4/2007 | Pascoe et al. | |
| 7,306,537 B2 | 12/2007 | Nakajima | |
| 7,390,279 B2 | 6/2008 | Cradit | |
| 7,662,060 B2 | 2/2010 | Miah | |
| 7,736,257 B2 | 6/2010 | Nakajima | |
| 7,749,124 B2 | 7/2010 | Nakajima | |
| 8,033,944 B2 | 10/2011 | Weber et al. | |
| 8,591,373 B2 | 11/2013 | Shibagaki | |
| 9,657,830 B2 | 5/2017 | Masuyama et al. | |
| 2008/0004151 A1 | 1/2008 | Nakajima | |
| 2009/0088286 A1 * | 4/2009 | Fujita | F16H 48/08 475/230 |
| 2010/0179014 A1 | 7/2010 | Hohle et al. | |
| 2015/0152952 A1 | 6/2015 | Miyazono et al. | |

FOREIGN PATENT DOCUMENTS

| | | |
|---|---|---|
| JP | H01279137 A | 11/1989 |
| JP | H04321847 A | 11/1992 |
| JP | H112311 A | 1/1999 |
| JP | 2006046642 A | 2/2006 |
| JP | 2006118658 A | 5/2006 |
| JP | 2014185666 A | 10/2014 |

OTHER PUBLICATIONS

Written Opinion & International Search Report for PCT/US2017/022439 dated Jun. 8, 2017, 9 pages.
CN Office Action for CN Application No. 201780017692.2 dated Nov. 4, 2020 (11 pages).
JP Office Action for JP Application No. 2018-568158 dated Jan. 12, 2021 (6 pages).

* cited by examiner

AUTOMOTIVE DIFFERENTIAL AND METHOD OF ASSEMBLING SAME

REFERENCE TO RELATED APPLICATIONS

This application claims the benefit of U.S. Provisional Application Ser. No. 62/308,696 filed on Mar. 15, 2016, the entire contents of which are incorporated herein by reference.

TECHNICAL FIELD

The present disclosure relates generally to differentials used in automobiles, and to methods of assembling same.

BACKGROUND

In general, automotive drivelines transmit torque from an engine to a set of wheels. Automotive drivelines are commonly equipped with a differential between sideshafts of a front axle, between sideshafts of a rear axle, or between sideshafts of both axles. Each axle typically includes a left sideshaft and a right sideshaft. Open differentials, in particular, allow a wheel on one sideshaft to spin faster or slower than a wheel on the other sideshaft. This occurs, for instance, when an automobile is turning a corner. Differentials also apportion driven torque between sideshafts. All-wheel drive (AWD) automotive drivelines can also be equipped with a differential between its front and rear axles to perform similar functions therebetween.

Furthermore, some automotive drivelines are equipped with disconnect capabilities in which disconnected components are no longer driven to transmit torque between them. The capabilities can preclude driven torque in regions of the automotive drivelines not needing torque transmission at a particular time. For instance, on-demand AWD drivelines do not always transmit torque among all of its shafts at all times. And the non-torque-transmitting shafts are disconnected and do not necessarily spin like they would when the shafts are connected. Disconnect capabilities have been shown to increase fuel mileage, reduce emissions, and provide yet additional performance enhancements.

SUMMARY

In at least one implementation, a method of assembling gears into a housing of an automotive differential includes:

selecting a thickness dimension of a first pinion gear washer and a second pinion gear washer;

selecting a thickness dimension of a first side gear washer and a second side gear washer;

locating a pair of pinion gears and a pinion shaft at least partially within an interior of the housing, and locating a pair of side gears at least partially within said interior and meshed with the pinion gears;

situating said first pinion gear washer between said housing and one of said pinion gears, and situating said second pinion gear washer between said housing and the other of said pinion gears; and situating said first side gear washer between said housing and one of said side gears, and situating said second side gear washer between said housing and the other of said side gears. Selecting the thickness dimension of said first and second side gear washers may be based at least in part upon target side gear apex positions residing along a side gear apex axis and relative to a pinion gear apex axis. Selecting the thickness dimension of said first and second pinion gear washers may be based at least in part upon target pinion gear apex positions residing along a pinion gear apex axis and relative to a side gear apex axis.

In at least some implementations, the method may include a step of determining an actual side gear apex position and comparing the actual side gear apex position to a target side gear apex position, and if the actual position and target position differ by more than a first threshold, changing one or both of the first side gear washer and the second side gear washer to a washer having a different thickness to move the actual side gear apex position. Also, the method may include, in combination with or separately from the above noted comparison relative to the side gear apex position, a step of determining an actual pinion gear apex position and comparing the actual pinion gear apex position to a target pinion gear apex position, and if the actual position and target position differ by more than a second threshold, changing one or both of the first pinion gear washer and the second pinion gear washer to a washer having a different thickness to move the actual pinion gear apex position. One or both of the first and second thresholds may be between 0.01 mm and 0.03 mm. The target pinion gear apex positions and target side gear apex positions may be determined as a function of the meshing between teeth on the pinion and side gears.

In at least some implementations, the target side gear apex position for the first side gear is determined as a function of the distance from a wall of the housing against which the first side gear washer is received to an axis of the pinion shaft. Similarly, the target pinion gear apex position for the first pinion gear may be determined as a function of the distance from a wall of the housing against which the first pinion gear washer is received to an axis of the housing that is perpendicular to an axis of the pinion shaft.

An automotive differential, in at least some implementations, may include a housing with an interior, a pair of pinion gears located within said interior and mounted on a pinion shaft, a pair of side gears located within said interior and meshing with said pinion gears during use of the automotive differential, a first pinion gear washer situated between said housing and one of said pinion gears, and a second pinion gear washer situated between said housing and the other of said pinion gears, and a first side gear washer situated between said housing and one of said side gears, and a second side gear washer situated between said housing and the other of said side gears. A thickness dimension of said first and second pinion gear washers is selected based at least upon target pinion gear apex positions residing along a pinion gear apex axis and relative to a side gear apex axis, and wherein a thickness dimension of said first and second side gear washers is selected based least upon target side gear apex positions residing along said side gear apex axis and relative to said pinion gear apex axis. The first side gear washer may have the same or a different thickness than the second side gear washer. The first pinion gear washer may have the same or a different thickness than the second side pinion washer.

BRIEF DESCRIPTION OF THE DRAWINGS

The following detailed description of preferred implementations and best mode will be set forth with regard to the accompanying drawings, in which.

DETAILED DESCRIPTION

Figure 1:
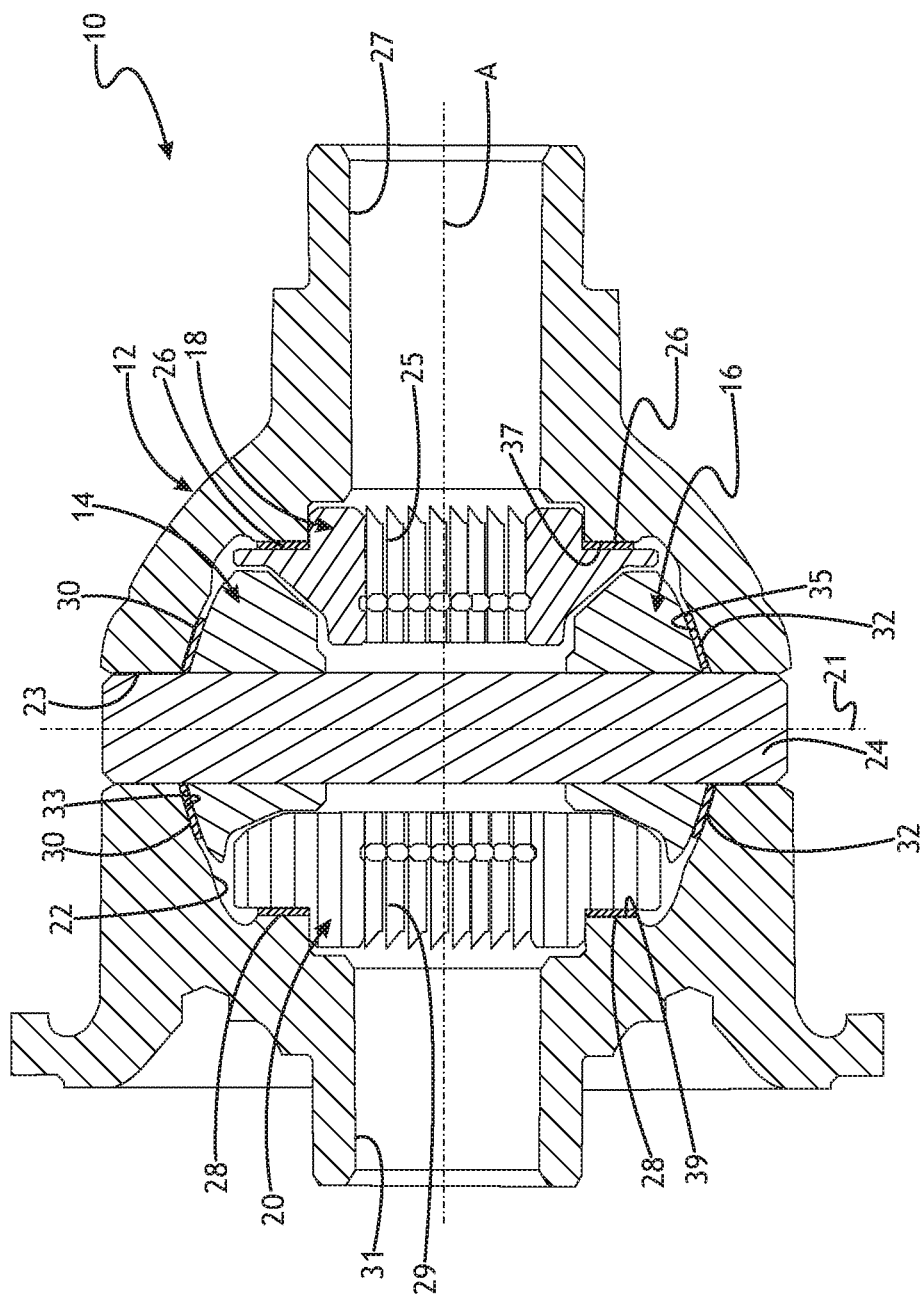
FIG. 1 is a sectional view of an embodiment of an automotive differential.

Referring in more detail to the drawings, an automotive differential 10 can be equipped in an all-wheel drive (AWD) automotive driveline for performing differential functionalities between sideshafts of a front axle, between sideshafts of a rear axle, or between sideshafts of both front and rear axles. Shimming along both a pinion gear apex axis and a side gear apex axis effects shifting of respective gear apexes toward sought-after target gear apex positions in order to optimize gear mesh points among teeth of the respective pinion and side gears of the automotive differential 10. Manufacturing tolerances and other imperfections are hence accommodated, and noise, vibration, and harshness (NVH) issues otherwise encountered at higher-rotational-speed disconnect modes in the automotive differential 10 are minimized, if not altogether resolved.

In general, the automotive differential 10 can have different designs and constructions depending upon, among other possible influences, the architecture of the larger AWD automotive driveline, upstream and downstream driveline components, packaging requirements, and torque output demands; for instance, the automotive differential could have more than two pinion gears, and could have three or four or more pinion gears. In the embodiment presented in the figures, the automotive differential 10 is an open differential and includes a housing 12, a first pinion gear 14, a second pinion gear 16, a first side gear 18, and a second side gear 20; still, more, less, and/or different components can be included in other embodiments. The housing 12 can have an input gear such as a ring gear at its exterior that is engaged by an upstream output gear such as that of a propeller shaft of the AWD automotive driveline. When driven, the housing 12 rotates about an axis A. The housing 12 can have windows in its walls that expose sections of the gears 14, 16, 18, 20, and that provide entry for assembling and installing the gears within an interior 22 of the housing 12. At the interior 22, the housing 12 defines a cavity suited to receive the pinion gears 14, 16 and suited to receive the side gears 18, 20 therein.

The first and second pinion gears 14, 16 and first and second side gears 18, 20 interact with one another to carry out the automotive differential's functionalities. Each of the gears 14, 16, 18, 20 has a set of teeth formed around its exterior. In this embodiment, in assembly and use of the automotive differential 10, the teeth of the first pinion gear 14 mesh with the teeth of the first and second side gears 18, 20, and similarly the teeth of the second pinion gear 16 mesh with the teeth of the first and second side gears 18, 20. The first and second pinion gears 14, 16 are mounted on a pinion shaft 24 having a center axis 21 and being mounted in opposed openings 23 in the differential housing. The first side gear 18 has a set of internal splines 25 for connection to a first sideshaft an end of which is received in an opening 27 of the housing 12, and the second side gear 20 has a set of internal splines 29 for connection to a second sideshaft an end of which is received in a generally oppositely facing opening 31 in the housing.

Figure 2:
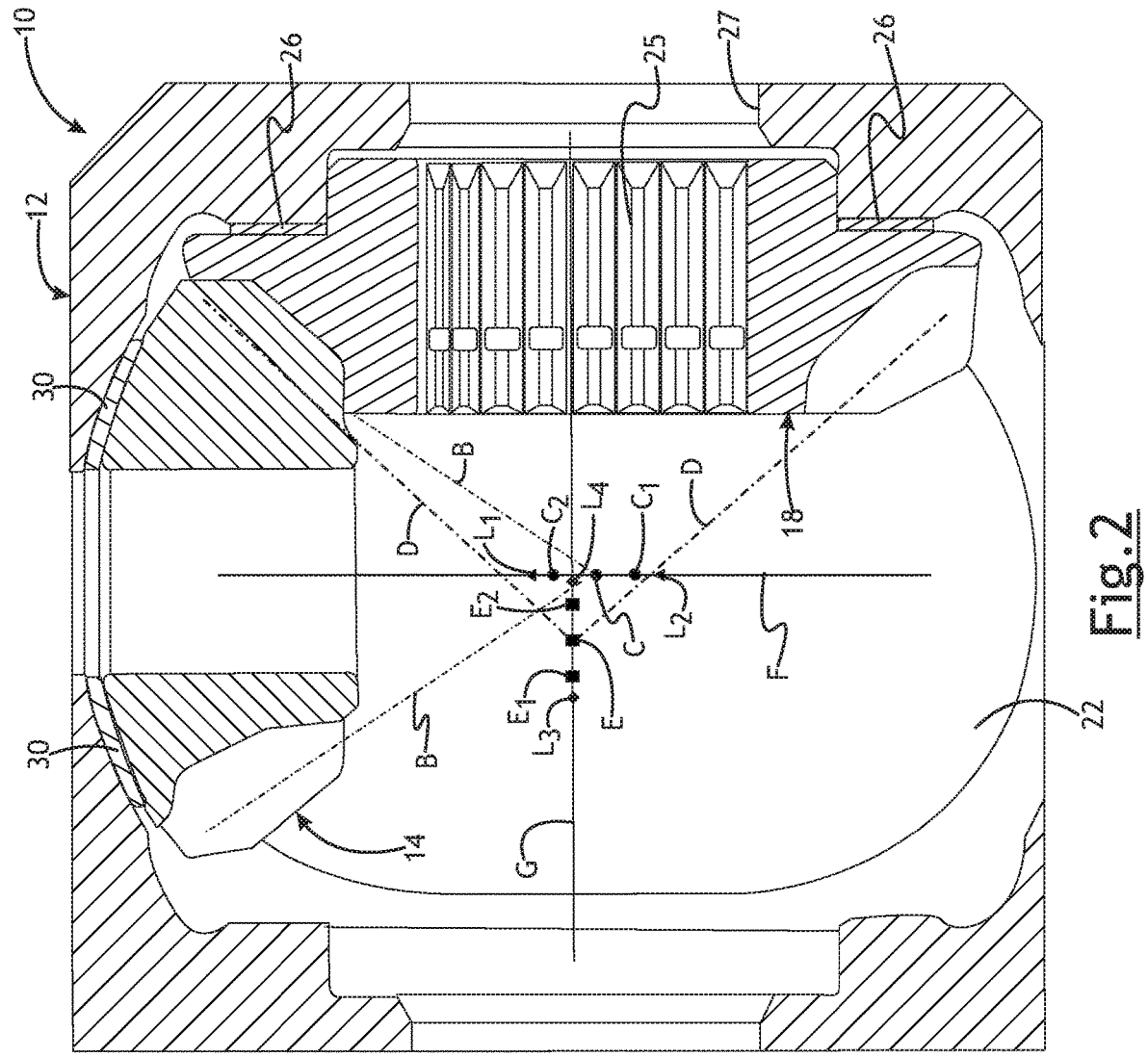
FIG. 2 is a partial view of the automotive differential of FIG. 1.

For each of the first and second pinion gears 14, 16 and first and second side gears 18, 20, its teeth are designed and constructed with a gear geometry that defines an imaginary cone shape tapering from the teeth and to a point apex. In general, the exact gear geometry can be dictated by—among other possible factors—the required durability and torque transmission demands of the particular gearset. Referring now to FIG. 2, in this example the imaginary cone shape defined by the first pinion gear 14 is denoted by imaginary teeth pitch lines B. The lines B converge toward each other and intersect at a first pinion gear apex C. Furthermore, in the example of FIG. 2, the imaginary cone shape defined by the first side gear 18 is denoted by imaginary teeth pitch lines D. The lines D converge toward each other and intersect at a first side gear apex E. While not depicted in FIG. 2, the second pinion gear 16 would likewise define an imaginary cone shape and second pinion gear apex, and the second side gear 20 would likewise define an imaginary cone shape and second side gear apex.

For assembly and installation, the first pinion gear 14 can be moved toward or away from the first and second side gears 18, 20; and/or the first side gear 18 can be moved toward or away from the first and second pinion gears 14, 16. Similarly, the second pinion gear 16 can be moved toward or away from the first and second side gears 18, 20; and/or the second side gear 20 can be moved toward or away from the first and second pinion gears 14, 16. These movements effect mesh depth of the gear teeth. For instance, as the first pinion gear 14 moves slightly closer to the first side gear 18 in FIG. 2, the position of the first pinion gear apex C shifts vertically downward along a pinion gear apex axis F and the teeth of the first pinion gear 14 mesh deeper (i.e., more intermeshed) with the teeth of the first side gear 18; this is also true of the teeth of the first pinion gear 14 and second side gear 20. And as the first pinion gear 14 moves slightly away from the first side gear 18, the position of the first pinion gear apex C shifts vertically upward along the pinion gear apex axis F and the teeth of the first pinion gear 14 mesh shallower (i.e., less intermeshed) with the teeth of the first side gear 18; this is also true of the teeth of the first pinion gear 14 and second side gear 20. Further, as the first side gear 18 moves slightly closer to the first pinion gear 14 in FIG. 2, the position of the first side gear apex E shifts horizontally leftward along a side gear apex axis G and the teeth of the first side gear 18 mesh deeper with the teeth of the first pinion gear 14; this is also true of the teeth of the first side gear 18 and second pinion gear 16. And as the first side gear 18 moves slightly away from the first pinion gear 14, the position of the first side gear apex E shifts horizontally rightward along the side gear apex axis G and the teeth of the first side gear 18 mesh shallower with the teeth of the first pinion gear 14; this is also true of the teeth of the first side gear 18 and second pinion gear 16.

Mesh point optimization refers generally to a depth of gear teeth mesh in which durability requirements and torque transmission demands are satisfied, and unwanted NVH issues are minimized. This condition is yet further complicated by manufacturing tolerances and imperfections of differential components. In the past, mesh point optimization only accounted for NVH issues experienced while pinion and side gears spun at lower-rotational-speeds under relatively normal operating modes without disconnect capabilities and disconnected components. This often meant optimizing for a desired degree of backlash—or clearance—between individual teeth, and could be accomplished by selecting a thickness dimension of side gear washers to move the side gears slightly closer to, or away from, the pinion gears. That slight movement was intended to bring the gear teeth to the desired mesh point optimization, despite the often unavoidable manufacturing tolerances and imperfections of the differential components. The side gear washer thicknesses and attendant side gear movements serve to shim the side gears along the single side gear axis.

While satisfactory for NVH experienced at the lower-rotational-speeds of normal operating modes, it has been found that shimming the side gears along the single side gear axis does not—under all circumstances—account for NVH issues experienced while pinion and side gears spin at higher-rotational-speeds amid disconnect modes with disconnected components. As an example, disconnect capabilities can be equipped at one of the sideshafts connected to one of the side gears. In the disconnect mode, the sideshaft lacking the disconnect capabilities nonetheless spins due to its associated wheel traversing over the ground as the automobile is travelling, and causes its connected side gear to spin as well. The opposite side gear with the disconnected sideshaft, in turn, spins in the opposite rotational direction. The side gears and pinion gears hence spin at the speed of rotation caused by the spinning sideshaft and traversing wheel during the disconnect mode, and opposite side gears spin in opposite rotational directions. This speed of rotation can oftentimes be much greater than the speed of rotation in non-disconnect mode. Consequently, the NVH experienced at the higher-rotational-speeds—and opposite rotational directions—can be more severe than those experienced at the lower-rotational-speeds and, it has been found, calls for a more precise mesh point optimization.

To resolve the NVH issues and achieve the more precise mesh point optimization, the thickness dimensions of both the side gear washers and pinion gear washers are selectable based upon certain target gear apex positions. That is, a first side gear washer 26, a second side gear washer 28, a first pinion gear washer 30, and a second pinion gear washer 32 are employed to shim the side gears 18, 20 along the side gear axis (or side gear apex axis G in FIG. 2) and to shim the pinion gears 14, 16 along the pinion gear axis (or pinion gear apex axis F in FIG. 2) according to certain target gear apex positions along the gear apex axes, as described below. The washer thicknesses and attendant gear movements serve to shim the gears along the dual side and pinion gear axes.

As illustrated in FIG. 1, the first pinion gear washer 30 is situated between a first interior wall 33 of the housing 12 and the first pinion gear 14, and the second pinion gear washer 32 is situated between a second interior wall 35 of the housing 12 and the second pinion gear 16. The first and second pinion gear washers 30, 32 can be of the spherical disc type, or can be another type of washer. The first side gear washer 26, on the other hand, is situated between a third interior wall 37 of the housing 12 and the first side gear 18, and the second side gear washer 28 is situated between a fourth interior wall 39 of the housing 12 and the second side gear 20. The first and second side gear washers 26, 28 can be of the thrust washer type, or can be another type of washer.

As set forth, the thickness dimensions of the side gear washers 26, 28 and pinion gear washers 30, 32 are selected based upon target gear apex positions; still, other factors may dictate the exact thickness dimensions of the washers. The target gear apex positions, in general, are positions along the gear apex axes in which the mesh point optimization condition is established between the respective gear teeth. For instance, and referring again to FIG. 2, once the first pinion gear apex C resides at the target first pinion gear apex position and the first side gear apex E resides at the target first side gear apex position, the meshing between the teeth of the first pinion gear 14 and the teeth of the first side gear 18 is such that durability requirements and torque transmission demands are satisfied, and unwanted NVH issues are minimized—if not altogether resolved—even at the higher-rotational-speeds amid disconnect modes with disconnected components.

In FIG. 2, the target first pinion gear apex position is depicted as a point residing along the pinion gear apex axis F and at the first pinion gear apex C, but need not necessarily be constituted by a single point and can instead be constituted by a range of points (i.e. an area) spanning between, and confined by, first and second limits (e.g., vertically upward and downward position limits on the pinion gear apex axis F, representative points $L_1$ and $L_2$ being labelled in FIG. 2). Likewise, in FIG. 2 the target first side gear apex position is depicted as a point residing along the side gear apex axis G and at the first side gear apex E, but need not necessarily be constituted by a single point and can instead be constituted by a range of points (i.e. an area) spanning between, and confined by, first and second limits (e.g., horizontally rightward and leftward position limits on the side gear apex axis G, representative points $L_3$ and $L_4$ being labelled in FIG. 2).

Still referencing the example of FIG. 2, if the mesh point optimization condition is not established between the pinion gears 14, 16 and side gears 18, 20, the thicknesses of the side gear washers 26, 28 and the thicknesses of the pinion gear washers 30, 32 may be varied to meet the mesh point optimization condition. Here, the thicknesses of the side gear washers 26, 28 can be modified together to have the same thickness dimension relative to each other, or can be modified separately to have different thickness dimensions relative to each other; likewise, the thicknesses of the pinion gear washers 30, 32 can be modified together to have the same thickness dimension relative to each other, or can be modified separately to have different thickness dimensions relative to each other. One way to determine whether a mesh point optimization condition is established at a gearset is by conducting NVH testing.

To simplify the example for demonstrative purposes, only the first pinion gear 14 and first side gear 18 are referenced. When it is determined that the first pinion gear apex C resides outside of the limits of the target first pinion gear apex position, the thickness of the first pinion gear washer 30 can be increased in order to shift the position of the first pinion gear apex C vertically downward along the pinion gear apex axis F (e.g. to point $C_1$ in FIG. 2), if needed, to bring the first pinion gear apex C inside of the limits of the target first pinion gear apex position. Contrariwise, the thickness of the first pinion gear washer 30 can be decreased in order to shift the position of the first pinion gear apex C vertically upward along the pinion gear apex axis F (e.g. to point $C_2$), if needed, to bring the first pinion gear apex C inside of the limits of the target first pinion gear apex position. Similarly, when it is determined that the first side gear apex E resides outside of the limits of the target first side gear apex position, the thickness of the first side gear washer 26 can be increased in order to shift the position of the first side gear apex E horizontally leftward along the side gear apex axis G (e.g. to point $E_1$), if needed, to bring the first side gear apex E inside of the limits of the target first side gear apex position. Contrariwise, the thickness of the first side gear washer 26 can be decreased in order to shift the position of the first side gear apex E horizontally rightward along the side gear apex axis G (e.g. to point $E_2$).

The target side gear apex positions may be determined as a function of the dimensions of the side gears including the geometry and arrangement of the side gear teeth, the dimensions of the pinion gears including the geometry and arrangement of the pinion gear teeth, and the geometry of the housing interior 22 in which the gears are received. For example, the thickness of the first side gear washer 26 may be chosen, at least in part, as a function of the distance from the third interior wall 37 to the axis 21 of the pinion shaft 24. Similarly, and by way of a non-limiting example, the thickness of the second side gear washer 28 may be chosen, at least in part, as a function of the distance from the fourth interior wall 39 to the axis 21 of the pinion shaft 24. A total distance between the third and fourth interior walls 37, 39 (in the area overlapped by the washers 26, 28) may also be used, if desired. Similarly, and by way of a non-limiting example, the thickness of the first pinion gear washer 30 may be chosen, at least in part, as a function of the distance from the first interior wall 33 to the axis A. Similarly, and by way of a non-limiting example, the thickness of the second pinion gear washer 32 may be chosen, at least in part, as a function of the distance from the second interior wall 35 to the axis A. A total distance between the first and second interior walls 33, 35 (in the area overlapped by the washers 30, 32) may also be used, if desired.

Accordingly, a method of assembling gears into a housing of an automotive differential, may include selecting a thickness dimension of a first pinion gear washer and a second pinion gear washer, and selecting a thickness dimension of a first side gear washer and a second side gear washer. A pair of pinion gears and a pinion shaft may be located at least partially within an interior of the housing, and a pair of side gears may also be located at least partially within said interior and meshed with the pinion gears. The first pinion gear washer may be received between the housing and one of the pinion gears, and the second pinion gear washer may be received between said housing and the other pinion gear. The first side gear washer may be received between the housing and one of the side gears, and the second side gear washer may be received between the housing and the other side gear.

In at least some implementations, a thickness of the first and second side gear washers may be selected based at least upon target side gear apex positions residing along a side gear apex axis and relative to a pinion gear apex axis. An actual side gear apex position, which is the determined by the relative locations of the actual gears and washers as installed in the housing may be determined or estimated, and compared to a target side gear apex position. If the actual side gear apex position and target position differ by more than a first threshold, which may be chosen to accommodate some degree of variability/tolerances among the parts across a production run of parts, one or both of the first side gear washer and the second side gear washer may be changed to a washer having a different thickness to move the actual side gear apex position to or closer to the target position. In at least some implementations, the first threshold may be 0.01 to 0.03 mm.

In at least some implementations, a thickness of the first and second pinion gear washers may be selected based at least upon target pinion gear apex positions residing along a pinion gear apex axis and relative to a side gear apex axis. An actual pinion gear apex position, which is the determined by the relative locations of the actual gears and washers as installed in the housing may be determined or estimated, and compared to a target pinion gear apex position. If the actual pinion gear apex position and target position differ by more than a second threshold, which may be chosen to accommodate some degree of variability/tolerances among the parts across a production run of parts, one or both of the first pinion gear washer and the second pinion gear washer may be changed to a washer having a different thickness to move the actual pinion gear apex position to or closer to the target position. In at least some implementations, the second threshold may be 0.01 mm to 0.03 mm.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A method of assembling gears into a housing of an automotive differential, comprising:
    providing a first pinion gear washer and a second pinion gear washer;
    providing a first side gear washer and a second side gear washer;
    locating a pair of pinion gears and a pinion shaft at least partially within an interior of the housing, and locating a pair of side gears at least partially within said interior and meshed with the pinion gears;
    situating said first pinion gear washer between said housing and one of said pinion gears, and situating said second pinion gear washer between said housing and the other of said pinion gears;
    situating said first side gear washer between said housing and one of said side gears, and situating said second side gear washer between said housing and the other of said side gears; and doing at least one of:
        determining an actual side gear apex position when the side gears and pinion gears are within said interior, and comparing the actual side gear apex position to a target side gear apex position which is a target position of the side gear apex when the side gears and pinion gears are within said interior, and if the actual side gear apex position and target side gear apex position differ by more than a first threshold, selecting a thickness of one or both of the first side gear washer and the second side gear washer to move the actual side gear apex position to a position within the first threshold from the target position; and
        determining an actual pinion gear apex position when the side gears and pinion gears are within said interior and comparing the actual pinion gear apex position to a target pinion gear apex position which is a target position of the pinion gear apex when the side gears and pinion gears are within said interior, and if the actual pinion gear apex position and target pinion gear apex position differ by more than a second threshold, selecting a thickness of one or both of the first pinion gear washer and the second pinion gear washer to move the actual pinion gear apex position to a position within the second threshold from the target position.

2. The method as set forth in claim 1 wherein:
1) the thickness of one or both of the first side gear washer and the second side gear washer is selected as a function of the actual side gear apex position, and 2) the thickness of one or both of the first pinion gear washer and the second pinion gear washer is selected as a function of the actual pinion gear apex position.

3. The method as set forth in claim 2 wherein the target pinion gear apex position and target side gear apex position are determined as a function of meshing between teeth on the pinion and side gears.

4. The method as set forth in claim 2 wherein the first threshold is 0.01 mm to 0.03 mm.

5. The method as set forth in claim 2 wherein the second threshold is 0.01 mm to 0.03 mm.

6. The method as set forth in claim 1 wherein the target side gear apex position for the first side gear is determined as a function of a distance from a wall of the housing against which the first side gear washer is received to an axis of the pinion shaft.

7. The method as set forth in claim 1 wherein the target pinion gear apex position for the first pinion gear is determined as a function of a distance from a wall of the housing against which the first pinion gear washer is received to an axis of the housing that is perpendicular to an axis of the pinion shaft.

8. An automotive differential, comprising:
a housing with an interior;
a pair of pinion gears located within said interior and mounted on a pinion shaft;
a pair of side gears located within said interior and meshing with said pinion gears during use of the automotive differential;
a first pinion gear washer situated between said housing and one of said pinion gears, and a second pinion gear washer situated between said housing and the other of said pinion gears; and
a first side gear washer situated between said housing and one of said side gears, and a second side gear washer situated between said housing and the other of said side gears;
wherein a thickness dimension of said first and second pinion gear washers is selected based at least upon target pinion gear apex positions residing along a pinion gear apex axis and relative to a side gear apex axis, and wherein a thickness dimension of said first and second side gear washers is selected based least upon target side gear apex positions residing along said side gear apex axis and relative to said pinion gear apex axis wherein the target pinion gear apex positions relate to the target positions of the pinion gear apexes when the side gears and pinion gears are within said interior, and wherein the target side gear apex positions relate to the target positions of the side gear apexes when the side gears and pinion gears are within said interior.

* * * * *